US009611160B2

(12) United States Patent
Underwood et al.

(10) Patent No.: US 9,611,160 B2
(45) Date of Patent: Apr. 4, 2017

(54) WASTEWATER TREATMENT APPARATUS AND METHOD

(71) Applicant: VWS (UK) Limited, Buckinghamshire (GB)

(72) Inventors: Lee Underwood, High Wycombe (GB); Paul Whitehead, Henley (GB); Alan Denton Mortimer, Henley-on-Thames (GB); Jean-Pierre Spanu, Saint Romain les Atheux (FR); James Keary, High Wycombe (GB)

(73) Assignee: VWS (UK) LTD., Marlow Bucks (GB)

( * ) Notice: Subject to any disclaimer, the term of this patent is extended or adjusted under 35 U.S.C. 154(b) by 927 days.

(21) Appl. No.: 13/933,346

(22) Filed: Jul. 2, 2013

(65) Prior Publication Data

US 2014/0158628 A1     Jun. 12, 2014

Related U.S. Application Data

(63) Continuation-in-part of application No. PCT/IB2011/003301, filed on Dec. 22, 2011.

(30) Foreign Application Priority Data

Jan. 7, 2011     (GB) .................................. 1100175.7
Feb. 6, 2013     (GB) .................................. 1302075.5

(51) Int. Cl.
    *C02F 1/46*          (2006.01)
    *C02F 9/00*          (2006.01)
                 (Continued)

(52) U.S. Cl.
CPC ................ *C02F 9/00* (2013.01); *C02F 1/008* (2013.01); *C02F 1/281* (2013.01); *C02F 1/283* (2013.01);
(Continued)

(58) Field of Classification Search
CPC .......... C02F 1/008; C02F 1/283; C02F 1/285; C02F 1/32; C02F 1/325; C02F 1/42;
(Continued)

(56) References Cited

U.S. PATENT DOCUMENTS 3,943,261 A     3/1976    Amon et al.
4,268,367 A     5/1981    Reis et al.
               (Continued)

FOREIGN PATENT DOCUMENTS

DE     197 24 786      12/1998
DE     20004007 U1     7/2001
               (Continued)

OTHER PUBLICATIONS

UK Search Report, Application No. GB1302075.5, Apr. 29, 2014, 2 pgs.
(Continued)

*Primary Examiner* — Walter D Griffin
*Assistant Examiner* — Cameron Allen
(74) *Attorney, Agent, or Firm* — Drinker Biddle & Reath LLP (57) ABSTRACT

A clinical analyser wastewater treatment apparatus is disclosed including a carbonator section. Preferably there is also an anodic oxidation section and a UV oxidation section, as well as a heavy metal removal section. The anodic oxidation section may include a conductive diamond anode. The apparatus may include a measurement device downstream of the carbonator section and a control system to control the operation of the carbonator. The measurement device is preferably a pH sensor.

10 Claims, 4 Drawing Sheets

(51) Int. Cl.
    *C02F 1/28*     (2006.01)
    *C02F 1/32*     (2006.01)
    *C02F 1/42*     (2006.01)
    *C02F 1/461*     (2006.01)
    *C02F 1/467*     (2006.01)
    *C02F 1/00*     (2006.01)
    *C02F 1/66*     (2006.01)
    *C02F 101/20*     (2006.01)
    *C02F 101/30*     (2006.01)
    *C02F 103/00*     (2006.01)

(52) U.S. Cl.
    CPC .......... *C02F 1/285* (2013.01); *C02F 1/32* (2013.01); *C02F 1/325* (2013.01); *C02F 1/42* (2013.01); *C02F 1/4618* (2013.01); *C02F 1/4672* (2013.01); *C02F 1/66* (2013.01); *C02F 2001/46138* (2013.01); *C02F 2101/20* (2013.01); *C02F 2101/30* (2013.01); *C02F 2103/003* (2013.01); *C02F 2209/06* (2013.01)

(58) Field of Classification Search
    CPC .. C02F 1/46; C02F 1/4672; C02F 1/68; C02F 9/00; C02F 2101/20; C02F 2103/003; C02F 2209/06; C02F 1/28; C02F 1/66
    See application file for complete search history.

(56) References Cited

U.S. PATENT DOCUMENTS

| | | | |
|---|---|---|---|
| 4,836,929 | A | 6/1989 | Baumann et al. |
| 4,954,230 | A | 9/1990 | Kirch |
| 5,308,507 | A | 5/1994 | Robson |
| 5,399,247 | A | 3/1995 | Carey et al. |
| 5,614,068 | A | 3/1997 | Kim |
| 5,900,127 | A | 5/1999 | Iida et al. |
| 6,180,014 | B1 | 1/2001 | Salama |
| 6,224,744 | B1 | 5/2001 | Casado |
| 6,298,996 | B1 | 10/2001 | Spiegel |
| 7,309,441 | B2 | 12/2007 | Rychen et al. |
| 2003/0024879 | A1 | 2/2003 | Carson |
| 2010/0314330 | A1 | 12/2010 | Picard |
| 2011/0017610 | A1 | 1/2011 | Hahn et al. |
| 2011/0024361 | A1* | 2/2011 | Schwartzel ............ C02F 1/325 210/739 |

FOREIGN PATENT DOCUMENTS

| | | |
|---|---|---|
| DE | 10 2004 040353 | 2/2006 |
| DE | 10 2007 041828 | 3/2009 |
| EP | 0659691 B1 | 5/1998 |
| EP | 1465273 B1 | 9/2009 |
| GB | 2 342 658 | 9/2002 |
| GB | 2467005 A | 7/2010 |
| JP | 5898185 A | 6/1983 |
| JP | 6274483 A | 4/1987 |
| JP | 11101761 A | 4/1999 |
| JP | 2007216173 A | 8/2007 |
| JP | 2010188315 A | 9/2010 |
| WO | 98/55239 | 12/1998 |
| WO | 99/01381 | 1/1999 |
| WO | 02085793 A1 | 10/2002 |
| WO | 03045835 | 6/2003 |
| WO | 2006049625 A1 | 5/2006 |
| WO | 2008150541 A1 | 12/2008 |
| WO | 2009030668 | 3/2009 |
| WO | 2009068797 | 6/2009 |
| WO | 2012093284 A2 | 7/2012 |
| WO | 2012093284 A3 | 7/2012 |

OTHER PUBLICATIONS

Extended European Search Report for Application No. 13196802.6, dated Apr. 17, 2014, 6 pages.
Gautam et al., "Preliminary study of physico-chemical treatment options for hospital wastewater", Journal of Environmental Management, Academic Press, London, GB, vol. 83, No. 3, Feb. 16, 2007, pp. 298-306.
Kajitvichyanukul et al., "Degradation and detoxification of formaline wastewater by advanced oxidation processes", Journal of Hazardous Materials, Elsevier, Amsterdam, vol. 135, No. 1-3, Jul. 31, 2006, pp. 337-343.
Sioi et al., "Photocatalytic treatment of colored wastewater from medical laboratories: Photocatalytic oxidation of hematoxylin", Journal of Photochemistry and Photobiology, A: Chemistry, Elsevier Sequoia, Lausanne, CH, vol. 184, No. 1-2, Nov. 15, 2006, pp. 18-25.
International Search Report for PCT/IB2011/003301, Aug. 23, 2012, 8 pages.
Purelab Ultra Brochure, Elga Labwater, Apr. 23, 2012, 2 pages.
UK Search Report, GB1200402.4, Apr. 26, 2012, 2 pages.
International Preliminary Report on Patentability, WIPO, PCT/GB2012/050045, Aug. 8, 2013, 5 pages.

* cited by examiner

WASTEWATER TREATMENT APPARATUS AND METHOD

FIELD OF THE INVENTION

The present invention relates to apparatus for treating clinical analyser wastewater and a method treating same.

BACKGROUND

Clinical analysers are well known in the art, generally being medical laboratory instruments able to analyse a sample, generally a medical sample, to determine one or more characteristics in or for a clinical purpose. One example is an analyser able to measure the properties of bodily fluids such as blood or urine, to assist in diagnosis of a condition or disease of a patient.

Clinical analysers can process a large portion of the samples going into a hospital or private medical laboratory. In the US, such apparatus are regulated under the Code of Federal Regulations (CFR) Title 21, in particular Part 862. Section 8622150 defines a continuous flow sequential multiple chemistry analyser for clinical use.

Clinical analysers, with their increasing automation, can provide faster and more accurate and more wide ranging information to a user or operator or to medical personnel, and are being increasingly used in research, hospitals, medical laboratories and similar faculties, often in batch processing environments.

Clinical analysers generally use one or more waters streams, often purified or indeed ultrapurified water, in the analysis and processing, and/or for cleaning of samples and sample holders, etc. The or each resultant water stream or streams, or 'effluent(s)', after such use is or are termed the 'wastewater'. Where there are multiple resultant streams, each stream can be dealt with separately, but are usually combined together to form a single wastewater stream. Due to the use of alkaline solutions such as sodium hydroxide in the analyser processes the wastewater is typically high pH.

With increasing health and safety legislation and increased local regulation, clinical analyser wastewater is increasingly unable to be simply discharged to a drain, but must instead be collected for off-site disposal or treatment, or is increasingly required to be treated on site.

Past clinical analyser wastewater treatment units that were commercially available involved various chemical treatment steps to provide disinfection and neutralisation of the analyser wastewater by the use of harsh chemicals such as strong sodium hydroxide, hydrochloric acid or peracetic acid. Such chemicals are not only harmful in themselves to the environment, but also require particular care in their use and safe disposal.

SUMMARY OF THE INVENTION

It is an object of the present invention to provide a clinical analyser wastewater treatment apparatus that does not rely on the use of such chemicals.

Thus, according to one aspect of the present invention, there is provided a clinical analyser wastewater treatment apparatus comprising at least an anodic oxidation section and a UV oxidation section.

According to a second aspect of the present invention, there is provided a clinical analyser wastewater treatment apparatus comprising at least an anodic oxidation section and a heavy metal removal section.

In this way, there is the much safer, chemical-free and environmentally friendly use of anodic oxidation for disinfection, rather than the use of strongly acidic or strongly alkaline chemicals.

Optionally, there is further provided pH adjustment of the wastewater stream, optionally prior to discharge of the treated stream. The pH adjustment may be provided in a pH adjustment section, and/or as part of and/or between one or more other sections of the wastewater treatment apparatus of the present invention.

It is also an object of the present invention to provide a clinical analyser wastewater treatment apparatus with improved pH control of the water before it is passed to drain.

Thus according to another aspect of the present invention, there is provided a clinical analyser wastewater treatment apparatus comprising at least a carbonator section.

According to a further aspect of the present invention, there is provided a clinical analyser wastewater treatment apparatus comprising at least a carbonator section, a measurement device downstream of the carbonator section and a control system to control the operation of the carbonator.

Optionally, one or more of the above apparatuses further includes an anodic oxidation section and/or a heavy metal removal section, and further optionally a UV oxidation section.

Optionally, one or more of the above apparatuses further includes an ultraviolet disinfection section downstream of the carbonator.

Optionally, in an embodiment, the clinical analyser wastewater treatment apparatus comprises:
  a. an anodic oxidation section;
  b. a heavy metal removal section;
  c. a carbonator section;
  d. a UV disinfection section;
  e. a pH sensor and/or a conductivity sensor; and
  f. a recirculation after the UV disinfection section to before the carbonator section.

Optionally, the one or more of the above clinical analyser wastewater treatment apparatus further comprises one or more holding tanks, such as a holding tank before the anodic oxidation section and a holding tank before the carbonator section.

Optionally, the clinical analyser wastewater treatment apparatus of the present invention is able to provide a treated stream having a COD of <2500 mg/l, preferably <2000 mg/l, and a pH<9, preferably a pH<8.5.

The treatment apparatus of the present invention comprises at least one inlet, optionally a plurality of inlets, optionally for receiving water from a number of waste outlets from a clinical analyser or from multiple clinical analysers.

Similarly, the treatment apparatus of the present invention comprises at least one outlet, optionally a plurality of outlets. Preferably, at least one outlet of the treatment apparatus provides a discharge, line or passage to a drain, preferably a non-dedicated drain within the environment of the clinical analyser.

The term "clinical analyser" as used herein relates to any apparatus, unit or instrument able to analyse a medical or biological sample, usually in an automated manner, and commonly in a multiple batch process, in order to measure or define one or more characteristics of or within the sample, such as the presence and/or amount of certain chemical or biological substances, such as particular markers or cells or the like. Suitable examples include the analysis of blood or other bodily fluids. In the US, such clinical analysers can be defined under CFR21 Part 862.

The term "wastewater" as used herein relates to one or more of the discharges or effluents from a clinical analyser which include one or more substances not considered environmentally safe for direct discharge into a drain or other non-clinical water system. Such substances include, but are not limited to, ions, organics, biochemical reagents, heavy metals, heavy metal complexes, inorganic salts, inorganic reagents, and any other chemically or biologically active bodies.

The term "carbonator" as used herein relates to any device that is used to dissolve gaseous carbon dioxide into the water stream. Carbonators are known in the beverage industry for adding pressurised carbon dioxide to the liquid. This changes the pH of the beverage making it acidic and provides for the formation of bubbles when the drink is opened or dispensed. Examples of carbonators for the drinks industry are as provided by IMI Cornelius (Brighouse, UK). A carbonator requires a source of carbon dioxide such as a pressurised cylinder such as supplied by BOC (Guildford, UK) and typically of high purity e.g. >99% or as defined in standards such as BS4105 part 1 or part 2; and a contactor which may be as simple as a sintered outlet but may also be a hydrophobic membrane such as available from Membrana (Wuppertal, Del.)

The "measurement device" may be a pH sensor but alternatively may be a sensor that will react to the pH of the stream such as a conductivity sensor that will measure a higher conductivity at elevated pH due to the conductivity of the hydroxide ion.

One or more of the discharges or effluents from a clinical analyser (forming the wastewater) may be the same or different from one or more other discharges or effluents, generally but not limited to differences in volume, substances and/or concentrations of one or more of the same or different substances. For example, a clinical analyser may discharge a strong or 'concentrated' effluent stream and a weak or 'diluted' effluent stream, the former being a discharge stream from one or more actual analyses, and the latter being a rinsing stream or the like. The skilled person is aware that the terms strong or 'concentrated' and weak or 'diluted' are relative to each other without limitation, but the former could be for example ×3, ×5 or ×10 the latter in the concentration of one or more substances.

The present invention includes any arrangement of the treatment of one or more similar or different discharge or effluent streams from a clinical analyser(s), optionally as a single entry stream or as different entry streams entering at different sections of the treatment apparatus or in or before different steps. All, some or only one of the streams may be alkaline as they enter the clinical analyser wastewater treatment apparatus.

Thus, and by way of example only, the wastewater able to be treated by the present invention could comprise:

(i) a single alkaline concentrated effluent stream, (ii) a first concentrated effluent stream combined with a first diluted stream prior to the anodic oxidation, either stream being alkaline; or (iii) a first concentrated effluent stream combined with a first diluted stream after the anodic oxidation, either stream being alkaline.

In environmental chemistry, the chemical oxygen demand (COD) test is commonly used to indirectly measure the amount of organic compounds in a fluid such as water: for example, the amount of organic pollutants in a water stream or sample. It is expressed in milligrams per litre (mg/L or mg/L as O2), indicating the mass of oxygen consumed per litre of solution, and the test is based on ISO 6060. Many governments now have strict regulations regarding the maximum COD allowed in wastewater before it can be discharged to a common drain.

Similar considerations and measurements can be considered for biological oxygen demand (BOD) of a stream.

pH is a measure of the concentration of the hydrogen ion in solution and in aqueous solutions a pH of 7 indicates a neutral solution with equal amounts of the dissociation species of water, hydronium and hydroxide ions at equilibrium with the combined molecule. Municipal water authorities have limits on the water that is passed into the drainage (sewerage) system in terms of the pH of the water as water away from neutral can have detrimental effects on the sewer systems' integrity, can have a detrimental effect on the workings of sewage treatment facilities especially those that use bacterial processes or could have an environmental effect if passed to rivers etc.

Thus, according to another aspect of the present invention, there is provided a method of treating a clinical analyser wastewater stream having a COD of >3000 mg/l comprising at least the steps of:

a. passing the stream through an anodic oxidation section; and b. passing the stream through a UV oxidation section;

c. to provide a treated stream having a COD of <2500 mg/l, preferably <2000 mg/l.

According to a further aspect of the present invention, there is provided a method of treating a clinical analyser wastewater stream having a COD of >3000 mg/l comprising at least the steps of;

a. passing the stream through an anodic oxidation section; and b. passing the stream through a heavy metal removal section; to provide a treated stream having a COD of <2500 mg/, preferably <2000 mg/l.

Optionally, the present invention provides a method of treating a clinical analyser wastewater stream having a COD of >3000 mg/l comprising at least the steps of;

a. passing the stream through an anodic oxidation section;

b. passing the stream through a UV oxidation section; and c. passing the stream through a heavy metal removal section; to provide a treated stream having a COD of <2500 mg/l, preferably <2000 mg/l.

According to yet another aspect of the present invention, there is provided a method of treating a clinical analyser wastewater stream having a pH>9 comprising at least the step of passing the stream through a carbonator to provide a treated stream having a pH<9, preferably a pH<8.5.

According to a further aspect of the present invention, there is provided a method of treating a clinical analyser wastewater stream having a pH of >9 comprising at least the steps of;

a. passing the stream through a carbonator;

b. measuring a property of the water downstream of the carbonator; and c. using the measurement to control the operation of the carbonator, to provide a treated stream having a pH between 9 but 5, preferably between 8.5 and 5.5.

Optionally, one or more of the above methods further comprises the step of passing the stream through a pH adjustment section, an anodic oxidation section and/or a heavy metal removal section.

Optionally, the method further comprises the step of passing the stream through an ultraviolet disinfection downstream of the carbonator.

The term "section" as used herein, such as in relation to an anodic oxidation section, any UV oxidation section, a heavy metal removal section, or a carbonator section can relate to a distinct or separate stage, position or location, or to a non-distinct or non-separate stage, position or location, across, during or at which the relevant function or process can occur or otherwise be applied to the wastewater.

Thus, the term "section" can include a position along a line or passageway for wastewater, optionally having one or more defined inlets and one or more defined outlets, during or across which the relevant process or action such as anodic oxidation, can be applied.

Additionally or alternatively, the term "section" can include a cell, tank, chamber, container, etc., able to contain a volume of wastewater, optionally having one or more defined inlets and one or more defined outlets, within which the relevant process or action such as anodic oxidation, can be applied.

Two or more sections of the treatment apparatus of the present invention may overlap, or at least have one or more overlapping regions or locations.

Preferably, at least two sections of treatment apparatus of the present invention are distinct and/or separate, having a distinct region, border, line or other passageway, such as a weir, thereinbetween.

Also preferably, each section of the treatment apparatus of the present invention is, or is carried out within, a distinct physical entity such as a cell, tank or passageway.

Thus, preferably, a clinical analyser wastewater treatment apparatus of the present invention comprises one or more of an anodic oxidation section, UV oxidation section, and heavy metal removal section, each section comprising a chamber for the passage of clinical analyser wastewater therethrough. Optionally the apparatus may also include a carbonator section.

The order of the various sections of the present invention, and in the various embodiments and examples particularly described herein, is not limited to their stated order as listed herein, and may be in any other order that is still capable of providing the treatment effect of a clinical analyser wastewater. Optionally, the order of the various sections is as listed herein.

Clinical analyser wastewater to the apparatus and methods of the present invention may be provided in a continuous manner, in a batch-wise manner, or a combination of same. Typically such wastewater is provided for a treatment after each batch of testing and analysing of relevant samples, but the invention is not limited thereto.

The present invention is able to work for any suitable flow rate of wastewater therethrough, depending upon the size, shape, design and composition of each section. A suitable commercial flow rate through the clinical analyser wastewater apparatus can be up to 2 l/h, although the present invention can be adapted to more particularly operate on higher and/or lower flow rates. Higher rates may apply where a larger volume of a diluted stream is combined with a post-anodic oxidation stream.

Partial, intermittent or full recirculation may be included to maximise contact time in one or more of the treatment sections.

Thus, the present invention can further comprise partial or intermittent recirculation of a stream from after at least one section to before at least another section. For example, recirculation of the treated stream from after any heavy metal removal section to before the anodic oxidation section.

Optionally, the treatment apparatus of the present invention includes a volume, such as but not limited to the volume of one or more of the sections of the treatment apparatus, and wastewater in the apparatus and not yet discharged from the apparatus defines a 'constant volume' or 'residual volume' of at least partly treated water in the apparatus. Where the apparatus involves partial intermittent or full recirculation of one or more water streams within the apparatus, the residual volume may involve the partial replacement of some of the residual volume by any further incoming stream of wastewater, and the discharge of a similar volume of treated water, such that the residual volume is wholly or substantially the same within the apparatus.

Recirculation of at least one water stream, and the presence of a residual volume, allows the present invention to treat a series of wastewater streams provided over time or in an irregular pattern, whilst providing discharge in a more desirable pattern.

According to one embodiment of the present invention, the anodic oxidation section includes a conductive diamond anode. Such an electrode has a core material or base electrode substrate, able to support on its outer (active) surface a diamond material. Several methods are known for depositing diamond material on an electrode substrate, including CVD and PVD processes, to provide a diamond film or coating, generally comprising fine diamond particles as a thin final layer. Generally, the diamond is provided as a synthetic diamond obtained by reducing one or more suitable organic compounds in a manner known in the art.

Preferably, the conductive diamond anode is a boron doped diamond electrode, wherein a small amount of a boron 'impurity' is included in the diamond material and/or final diamond layer. Boron doped diamond electrodes are tough and resistant to degradation, as well as being chemically stable, resistant to thermal shock and able to exhibit high electrochemical stability. Such electrodes do not interact or bind to organic pollutants but can provide direct anodic oxidation to a water stream by the stripping of electrons from the covalent bonds of polluting substances. Such electrodes can be made by polycrystalline diamond formed by chemical vapour deposition (CVD) in a high temperature microprocess.

Thus, the treatment apparatus and method of the present invention preferably further comprise passing the wastewater, generally as a stream, through an anodic oxidation section including a conductive diamond anode, preferably a boron doped diamond electrode, to oxidise the organic molecules and/or microorganisms in the stream, preferably prior to its passage through the carbonator.

A UV oxidation and/or disinfection section for use with the present invention may comprise the use of any application of UV light to a stream, passage or flow of wastewater through such a section. The application of UV light at suitable wavelengths including 185 or 254 nm is well known in the art, commonly provided by one or more UV tubes or lamps located within and/or around the flow or passage of the wastewater through the UV oxidation or disinfection sections.

A heavy metal removal section of the treatment apparatus of the present invention may comprise one or more filters or substances able to remove heavy metal substances, in particular heavy metal ions, from a flow or passage of wastewater. Suitable substances or materials are known in the art, and include, but are not limited to; resins, especially chelating resins, absorbents, adsorbents, and carbon-based materials such as activated carbon (AC).

pH adjustment of the stream, optionally prior to discharge of the stream to a drain or the like, may be carried out by any known means such as dosing or passage through a media such as a bed of weak acid cation ion exchange resin.

According to another embodiment of the present invention, the wastewater stream comprises a first concentrated stream passing through the anodic oxidation section and a first diluted steam combined with the treated stream after the anodic oxidation. The first diluted steam could be a rinsing stream and could be combined with the treated stream either prior to their combined discharge to a drain, or prior to the carbonator (if present) and/or any further treatment section present or of the concentrated stream after the anodic oxidation.

According to a further embodiment of the present invention, there is provided a method for the treatment of clinical analyser wastewater having the following composition:

| Parameter | Unit | Concentration |
|---|---|---|
| Chemical Oxygen Demand (COD) | mg/l | 3600 |
| Biological Oxygen Demand (BOD) | mg/l | 1500 |
| Bromide | mg/l | 1200 |
| Ammonia ($NH_4$) | mg/l | 27 |
| Total Phenols | mg/l | 0.9 |
| Ortho-Phosphate | mg/l | 54 |
| Copper | mg/l | 0.9 |
| Adsorbable Organic Halogenes (AOX) | mg/l | 2 |
| EDTA | mg/l | 39 |
| pH | | 11 |

According to a further aspect of the present invention, there is provided use of anodic oxidation with or without carbonation for the treatment of clinical analyser wastewater having a COD of >3000 mg/l and optionally pH>10. The anodic oxidation may be carried out by any know means such as using a conductive diamond anode, optionally a boron doped diamond electrode, the carbonation by any known means such as using a pressurised cylinder and a membrane contactor.

According to another aspect of the present invention, there is provided a method of reducing the COD in a clinical analyser wastewater stream having a COD of >3000 mg/l, comprising at least the steps of:
　a. passing the stream through an anodic oxidation section; and
　b. at least one of:
　c. passing the stream through a UV oxidation section; and
　d. passing the stream through a heavy metal removal section; to provide a treated stream having a COD of <2500 mg/l, preferably <2000 mg/l.

Optionally, the method of reducing COD in a clinical analyser wastewater stream having a COD of >3000 mg/l comprising at least the steps of:
　a. passing the stream through an anodic oxidation section;
　b. passing the stream through a UV oxidation section; and
　c. passing the stream through a heavy metal removal section; to provide a treated stream having a COD of <2500 mg/l, preferably <2000 mg/l.

Preferably, the treated wastewater able to be discharged to a drain or otherwise into the environment by the present invention has a specification of:
　a. <2000 mg/L COD as O2, or <500 mg/L, <400 mg/L or <300 mg/L
　b. <800 mg/L BOD as O2, or <400 mg/L, <300 mg/L, <200 mg/L or <100 mg/L
　c. <600 mg/L as suspended solids
　d. <0.5 mg/L $Cu^{2+}$, or <0.01 mg/L or <0.05 mg/L or <0.02 mg/L
　e. <0.1 mg/L CN—

According to another aspect of the present invention, there is provided a method of reducing the COD and pH in a clinical analyser wastewater stream having a COD of >3000 mg/l and a pH>10, comprising at least the steps of:
　a. passing the stream through an anodic oxidation section; and
　b. passing the stream through a carbonator, to provide a treated stream having a COD of <2500 mg/l, preferably <2000 mg/l, and a pH<9, preferably a pH<8.5.

Optionally, the method of reducing COD and pH in a clinical analyser wastewater stream having a COD of >3000 mg/l and pH>10 comprising at least the steps of:
　a. passing the stream through an anodic oxidation section;
　b. passing the stream through a carbonator,
　c. measuring a property of the water downstream of the carbonator and using the measurement to control the operation of the carbonator,
to provide a treated stream having a COD of <2500 mg/l, preferably <2000 mg/l and a pH<9, preferably a pH<8.5.

Optionally, the methods can further include passing the stream through an ultraviolet disinfection section downstream of the carbonator.

Optionally, the methods further comprise the step of partially or fully recirculating the water downstream of the carbonator through the carbonator when the parameter measurement is below a pre-determined value.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features and values described in relation to one embodiment can typically be combined alone or together with other features in different embodiments of the invention. For example, the examples that are described hereinafter show examples of treated wastewater having a specification of chemicals and values that are a selection of the values listed hereinabove, without limitation to a particular combination.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of processes, sections, apparatus, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of, "consisting", "selected from the group of consisting of", "including", or "is" preceding the recitation of the composition, element or group of elements and vice versa.

All numerical values in this disclosure are understood as being modified by "about". All singular forms of elements, or any other components described herein including (without limitations) components of the apparatus to collect cuttings are understood to include plural forms thereof and vice versa.

BRIEF DESCRIPTION OF THE DRAWINGS

Thus, embodiments of the present invention will now be described by way of example only and with reference to the accompanying drawings in which.

DETAILED DESCRIPTION OF THE EMBODIMENTS

It is known that effluent waste or wastewater from clinical analysers requires to be treated before it can be considered environmentally safe, for example within a definition of local government regulations, for acceptable discharge to a standard drain or drainage system, generally for subsequent reuse or possible discharge into the local environment.

Current systems or units for treating clinical analyser wastewater involve the use of various harsh chemicals, generally in consumer packs or replacement packs. This therefore not only involves the use of such harsh or hazardous chemicals, but expensive service and consumable costs, including the required disposal of the consumable packs after use.

The principle of operation of such systems is to treat the effluent or wastewater by the chemical removal of ions and biochemical reagents, heavy metal complexes, and commonly other inorganic salts/reagents, followed by the destruction of all biological activity.

One measurement in environmental chemistry of the contamination in a stream, such as a wastewater stream, is the chemical oxygen demand (COD), which can measure the amount of organic compounds therein, in particular organic pollutants.

It has been found that the COD level in a number of measured clinical analyser wastewater streams is between 3000 and 4000 mg/L (as O2), and it can be as high as 8000 mg/L. An object of the present invention is to reduce the COD level in a clinical analyser wastewater flow or stream to below 2000 mg/L prior to discharge to a drain or the like.

Figure 1A:
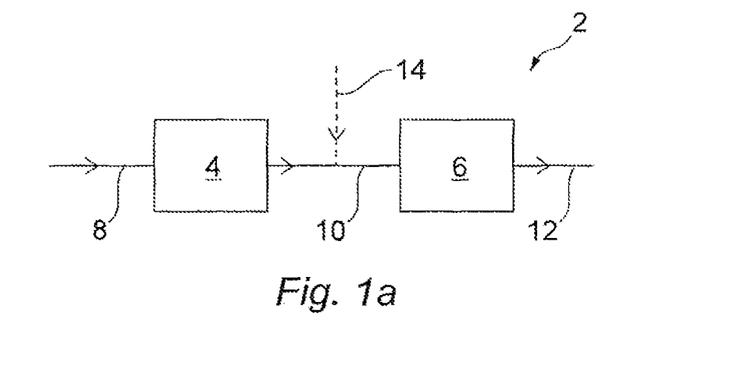
FIGS. 1a, 1b, 1c and 1d are four water treatment apparatus according to three embodiments of the present invention.

FIG. 1a shows a first clinical analyser wastewater treatment apparatus 2 according to the present invention, comprising an anodic oxidation section 4 and a UV oxidation section 6. A clinical analyser wastewater flow or stream, preferably a concentrated effluent stream, can be provided along an inlet 8 to pass through the anodic oxidation section 4 in the form of cell or chamber, such as an electrochemical cell, having a conductive diamond anode (not shown), such as a boron doped diamond electrode, therewithin. After passage through the anodic oxidation section 4, the part-treated wastewater stream 10 can then be provided along line 10 to a UV oxidation section 6. Within the UV oxidation section 6, there are provided one or more UV tubes or lamps (not shown), able to provide UV oxidation in a manner known in the art to the part-treated wastewater stream therewithin, to provide a first treated stream 12 ready for discharge.

Optionally, the part-treated stream 10 is diluted with a dilution effluent stream 14 as described in further detail herein below.

Figure 1B:
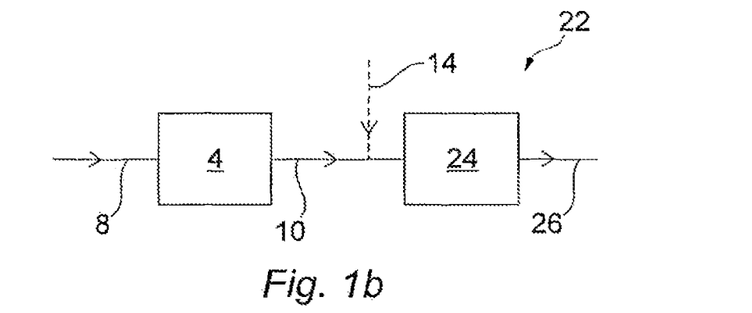

FIG. 1b shows a second clinical analyser wastewater treatment apparatus 22 according to the present invention, comprising an anodic oxidation section 4 and a heavy metal removal section 24. A clinical analyser wastewater flow or stream as before can be provided along an inlet 8 to pass through the anodic oxidation section 4 in the form of tank or chamber, having a conductive diamond anode (not shown), preferably a boron doped diamond electrode, therewithin. After passage through the anodic oxidation section 4, the part-treated stream 10 in line 10, optionally diluted with a dilution stream 14, is then provided to the heavy metal removal section 24.

The heavy metal removal section 24 may comprise one or more chambers, compartments or stages (not shown), and optionally one or more resins, in particular ion-exchange resins, and filters, such as activated carbon filters, to remove heavy metal substances or particles, in particular heavy metal ions, from the wastewater, to provide a second treated stream 26. Typical heavy metals to be removed from clinical analyser wastewater include, but are not limited to, copper, calcium, zinc, silver, arsenic, cadmium and mercury.

Figure 1C:
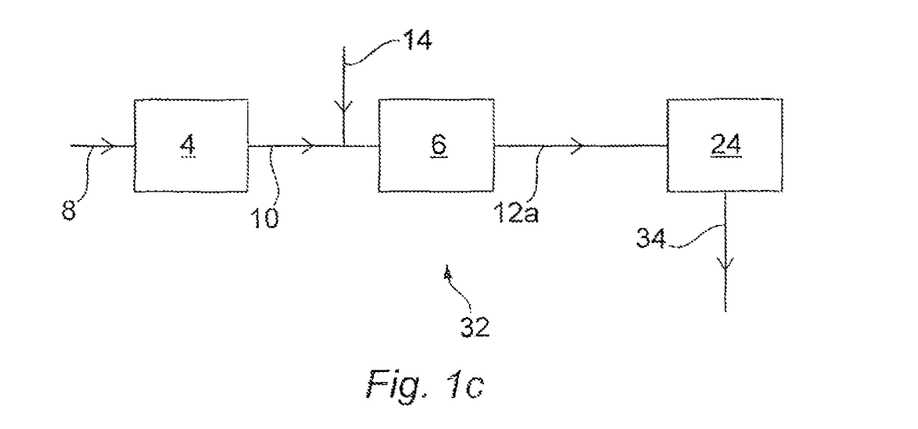

FIG. 1c shows a third clinical analyser wastewater treatment apparatus 32 according to the present invention, comprising an anodic oxidation section 4 and a UV oxidation section 6 and a heavy metal removal section 24. A clinical analyser wastewater flow or stream as before can be provided along an inlet 8 to pass through the anodic oxidation section 4 in the form of tank or chamber, having an conductive diamond anode (not shown), preferably a boron doped diamond electrode, therewithin. After passage through the anodic oxidation section 4, the part-treated wastewater stream 10 can then be provided along line 10 to a UV oxidation section 6, optionally diluted with a dilution stream 14.

Within the UV oxidation section 6, there are provided one or more UV tubes or lamps (not shown), able to provide UV oxidation in a manner known in the art to the part-treated wastewater stream therewithin, to provide a second part-treated wastewater stream 12a in line 12a which is then provided to the heavy metal removal section 24. The heavy metal removal section 24 may comprise one or more chambers, compartments or stages, and optionally one or more resins, in particular ion-exchange resins, and filters, such as activated carbon filters, to remove heavy metal substances or particles, in particular heavy metal ions, from the wastewater, to provide a third treated stream 34.

Figure 1D:
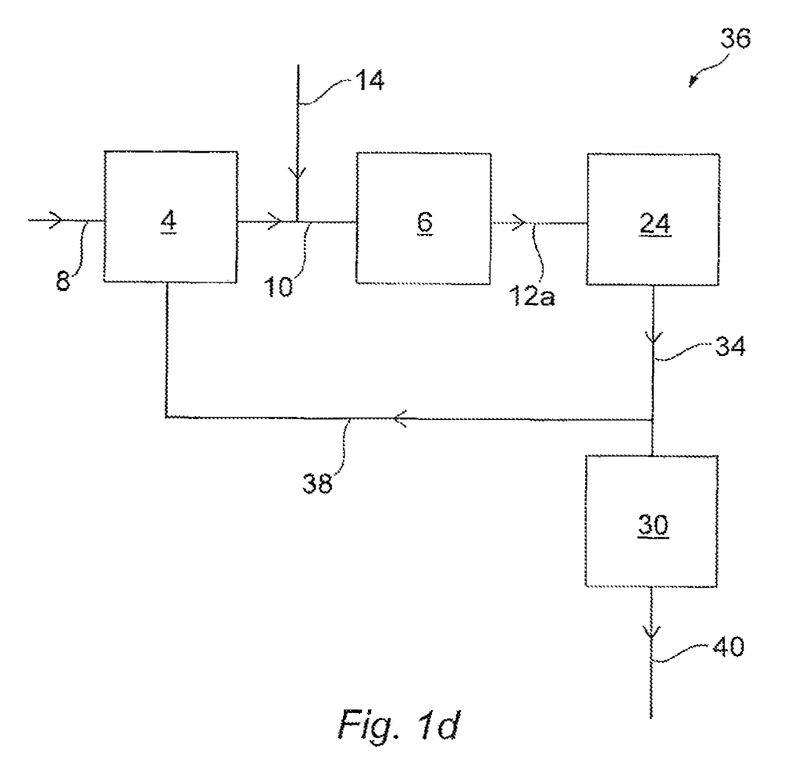

FIG. 1d shows a fourth clinical analyser apparatus 36 being an extension of the third apparatus 32 shown in FIG. 1c. In FIG. 1d, a recirculation stream 38 returns part of the third treated stream 34, intermittently or continuously, to the anodic oxidation section 4 by tanks, valves and pumps (not shown) as required. This provides for repeated treatments of the wastewater and also maintains a residual volume in the apparatus while further inlet waters 8, 14 are awaited from batch operation of the clinical analyser. The rest of the water from the third treated stream 34 is passed to a pH adjustment section 30 containing one or more elements or substances to adjust the pH of the stream to be within allowable limits. This is preferably achieved by passage through an ion exchange material such as weak acid cation ion exchange resin. The liquid exits the pH adjustment section 30 as a fourth treated stream 40.

Figure 2:
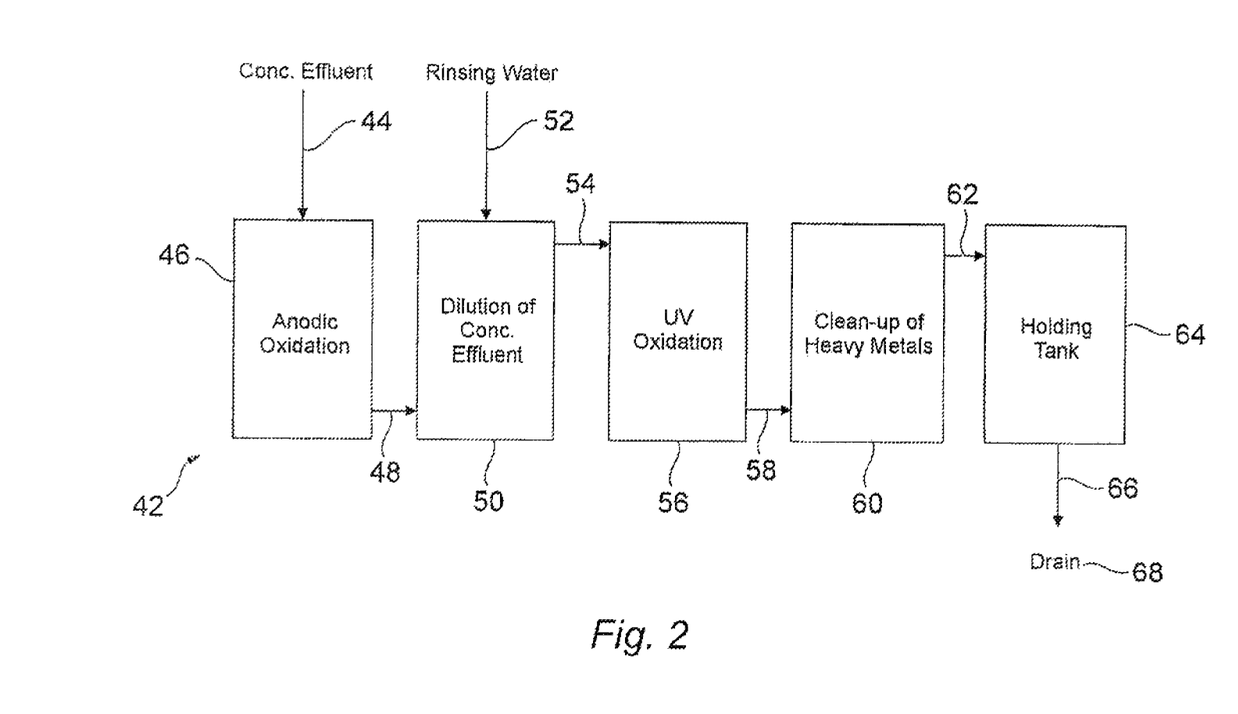
FIG. 2 is a water treatment apparatus according to a further embodiment of the present invention.

FIG. 2 shows a fifth clinical analyser wastewater treatment apparatus 42 according to a further embodiment of the present invention. FIG. 2 shows a concentrated effluent stream 44 passing along line 44, typically having a COD level between 3000 and 4000 mg/L, and requiring treatment prior to environmentally safe discharge.

The wastewater stream 44 passes into an anodic oxidation section 46 comprising a chamber having a boron doped diamond electrode (not shown) therein for providing anodic oxidation to the wastewater stream 44.

The passage of the wastewater stream 44 to the fourth treatment apparatus 42 may require one or more pumps. Optionally, one or more further pumps may be required in the treatment apparatus 42 in order to continue or maintain the flow of wastewater therethrough.

Preferably, the fourth treatment apparatus 42 can accommodate up to two litres/hour of concentrated waste as the wastewater stream 44.

The anodic oxidation section 46 provides a first stage of treatment (by anodic oxidation as discussed hereinabove), to provide a first part-treated stream 48. Optionally, the first part-treated stream 48 is then diluted by the addition of a diluted stream 52, such as a rinsing water stream also discharged from the clinical analyser, and optionally in a distinct or separate chamber 50, although optionally also as the mixing of two lines or streams. Dilution with a rinsing water stream 52 can help reduce the COD level of the combined steam to below a predetermined target such as 2000 mg/L prior to further treatment wastewater. The dilution ratio can be any suitable ratio, typically 2-20:1 rinsing water:part-treated stream, and possibly in the range 4:1 to 12:1 such as 10:1 in favour of the rinsing water stream 52, to provide a combined stream 54.

The diluted stream 52 may be the same as the dilution stream 14 mentioned hereinbefore.

The combined stream 54 then passes into a UV oxidation section 56 able to provide further oxidation of substances in the wastewater in a manner known in the art, typically involving one or more UV lamps or tubes having a wavelength of 185/254 nm, to provide a second part-treated stream 58.

The second part-treated stream 58 then passes into a heavy metals removal section 60 for the clean up of heavy metals such as copper. This section 60 could include one or more consumable packs comprising ion-exchange resins or activated carbon or other filtration substances known for the removal of heavy metals from a stream, to provide a treated stream 62.

The treated stream 62 could be discharged directly, or provided into a holding tank 64 for controlled discharge as a discharge 66 to a suitable drain 68.

The embodiments described above with reference to the drawings also describe methods of treating a clinical analyser wastewater stream having a COD of >3000 mg/L, as well as describing the use of anodic oxidation for the treatment of clinical analyser wastewater having a COD of >3000 mg/L.

EXAMPLES

Using an apparatus of the type shown in FIG. 1*d* a number of wastewater streams from a Roche Diagnostics Cobas 6000 immunochemistry clinical analyser that was producing a concentrated waste of 12 litres per day, as well as an associated rinse waste, were tested, with the outlet discharge streams being provided over a number of time periods.

The treatment apparatus comprised an anodic oxidation cell containing a boron doped diamond anode of area 180 cm2 operated at 5 volts. The UV treatment stage used a Voltarc (CT, USA) GXO18T5L 254 nm UV lamp. The heavy metal removal section comprised 1.45 litres of A0508 charcoal from Jeret Limited (UK) and the pH adjustment section comprised 1.0 litre of Dowex MAC-3 weak acid cation ion exchange resin from Dow Chemicals. The analyser was operated 6 days per week. The analyses of the concentrated wastewater influents and the treated waters were carried out at different periods of time, and after at least some recirculation of the treated stream after the heavy metal removal section. Such recirculation improves the percentage removals and percentage reductions desired.

The results are shown in the accompanying Table 1. Greater than 90% COD and BOD reductions were regularly possible in this way, and greater than 60%, 70% or 80% reduction in chemical levels were also regularly possible.

Cyanide levels in the influent were around 0.05 mg/l, so that they have not been included in table 1. Outlet copper analyses reached the limit of detection of the analysis. Thus, 'sulphates' analyses were included as a comparator, as they would have been similarly diluted by the rinse water, thereby giving a comparison for the reduction in COD.

As can be seen from the results in Table 1, after each wastewater influent, the wastewater had been treated to acceptable levels for discharge.

Figure 3:
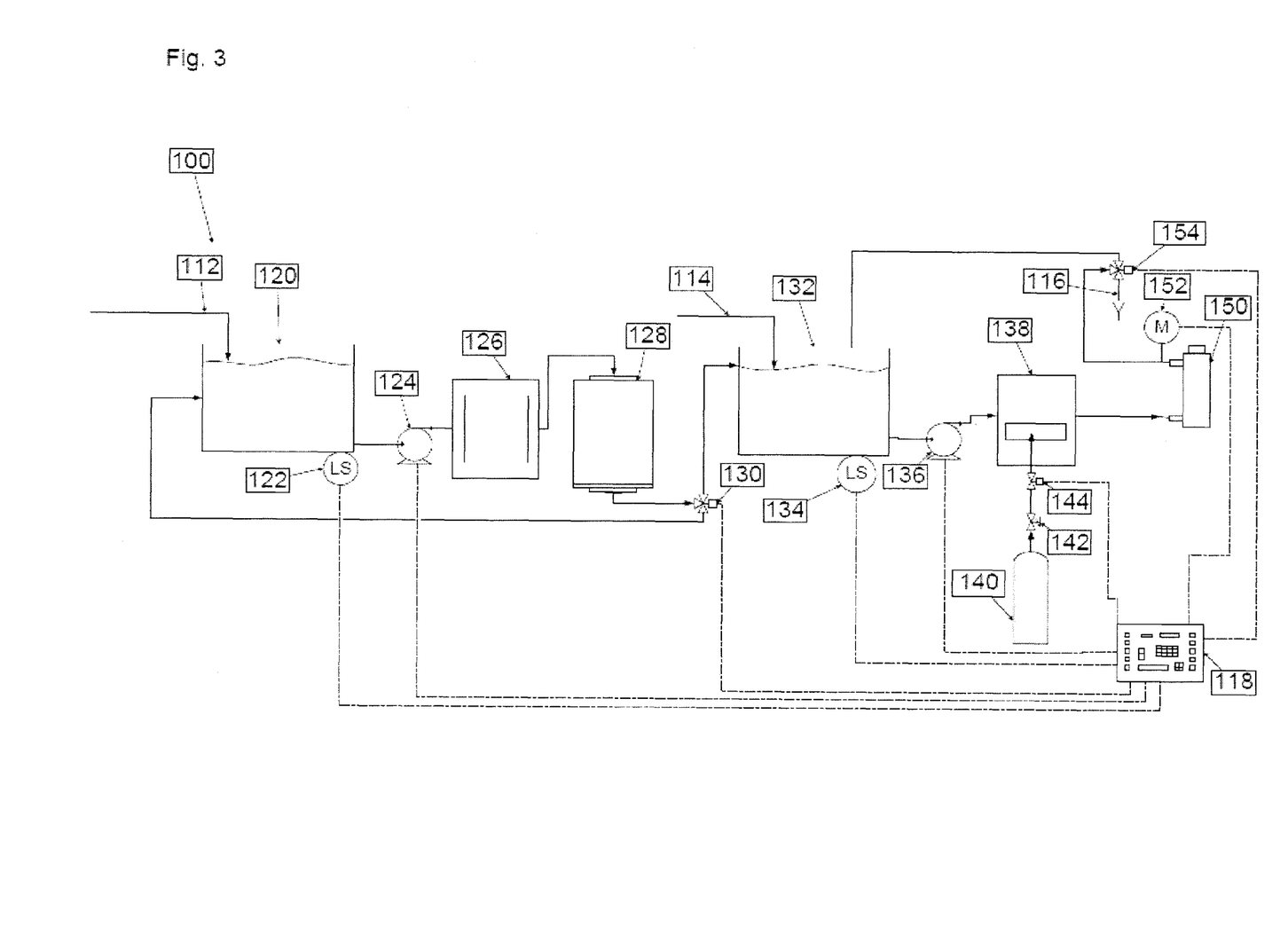
FIG. 3 shows a first clinical analyser wastewater treatment apparatus 100 according to another embodiment of the present invention.

Referring now to FIG. 3, an alternate embodiment 100 of the invention is depicted. A concentrated effluent stream 112 and optionally a second more dilute stream 114 from a clinical analyser are passed to the clinical analyser wastewater treatment apparatus as produced by the clinical analyser. These streams may be continuous, intermittent or of varying flow pattern.

The wastewater treatment apparatus processes the fluids and dispenses them via an outlet 116 which may be directed to a drain or holding vessel as appropriate. A controller 118 contains a microprocessor and uses inputs from the treatment apparatus' sensors and its programmed logic to operate the flows and processes within the treatment apparatus.

The concentrated effluent is passed to a first reservoir, 120, with a level sensor 122 of any known design. When the level in the reservoir is appropriate pump 124 passes the wastewater to anodic oxidation section 126. This anodic oxidation may be in the form of cell or chamber, such as an electrochemical cell, having a conductive diamond anode (not shown), such as a boron doped diamond electrode, therewithin.

After passage through the anodic oxidation section 126, the part-treated stream is then provided to the heavy metal removal section 128. The heavy metal removal section 128 may comprise one or more chambers, compartments or stages (not shown), and optionally one or more resins, in particular ion-exchange resins, and filters, such as activated carbon filters, to remove heavy metal substances or particles, in particular heavy metal ions, from the wastewater. Typical heavy metals to be removed from clinical analyser wastewater include, but are not limited to, copper, calcium, zinc, silver, arsenic, cadmium and mercury.

After passage through the heavy metal removal section 128 the part treated wastewater can be passed to a second reservoir 132 or returned to reservoir 120 by a three way valve 130 depending upon the levels in the reservoirs 120 and 132. This return to the reservoir 120 provides for repeated treatments of the wastewater and also maintains a residual volume in the apparatus while further inlet waters 112, 114 are awaited from batch operation of the clinical analyser.

If present, the more dilute stream from the clinical analyser, 114, also feeds into the second reservoir 132. The second reservoir contains level sensors 134 in co-operation with the controller 118.

Controller 118 initiates pump 136 as appropriate to pass the partially treated wastewater into the carbonator 138. This contains a method of passing gaseous carbon dioxide in to the fluid and may comprise a simple contactor such as a sinter or a more complicated device such as fibres of hydrophobic membrane. It may be operated under pressure to improve dissolving or may be operated at atmospheric pressure. The carbon dioxide may be supplied from a cylinder, 140, which may be local to the treatment apparatus 110 or may be sited at a more distant location such as an outside gas cage. The cylinder, 140 may supply more than one wastewater treatment apparatus or have diverse uses. The outlet pressure from the cylinder is regulated 142 and the flow is controlled within the wastewater treatment apparatus via valve 144 in co-operation with controller 118.

After passage through the carbonator section the treated wastewater is passed through a UV disinfection section, 150. Within the UV disinfection section 150, there are provided one or more UV tubes or lamps (not shown), able to provide UV disinfection in a manner known in the art to the part-treated wastewater stream therewithin.

A sensor 152 is also sited downstream of the carbonator. The sensor is in communication with the controller, 118, and measures a parameter of the fluid so as to ascertain whether the pH of the fluid is within the desired limits. This parameter may be a milli-voltage as pH sensor but may alternatively be a milli-voltage as from a conductivity sensor.

Dependant on the value from the sensor the outlet valve 154 may pass the treated fluid to the drain 16 or return the fluid to the second reservoir 132 for further passage through the treatment processes.

The embodiments described above may also involve one or more sensors or other sensing devices able to sense or measure the level of one or more parameters of one or more of the streams, in particular one or more of the wastewater streams, such as the COD levels, etc.

The embodiments described above may include one or more alert or alarms, such as one or more visual or aural alarms, able to provide an alarm signal to a user or operator to indicate the non-function of a section, or the detecting or measuring of a parameter in a stream above or below one or more predetermined limits, including the operational lifetime of one or more consumable items such as purification pack.

The invention claimed is:

1. A clinical analyser wastewater treatment apparatus comprising:
    a first pipe connected to a clinical analyser for receiving a stream of wastewater from the clinical analyser;
    a first holding tank connected to the first pipe for receiving the stream of wastewater;
    an anodic oxidation section located downstream from the first holding tank, the anodic oxidation section having an inlet for receiving a stream of wastewater from first holding tank and an outlet for dispensing a stream of the wastewater after processing in the anodic oxidation section;
    a second holding tank for receiving a stream of the wastewater after processing in the anodic oxidation section, the second holding tank having an outlet;
    a carbonator section for receiving a stream of wastewater from the outlet of the second holding tank;
    a UV disinfection section;
    a sensor positioned downstream from the carbonator for receiving a stream of wastewater after processing in the carbonator section; and
    a recirculation pipe having a first end connected downstream from the UV disinfection section but before a drainpipe, the recirculation pipe second end located at a position so as to recirculate a stream of wastewater after UV disinfection back to the second holding tank based on sensed data.

2. A clinical analyser wastewater treatment apparatus as claimed in claim 1 further comprising a heavy metal removal section connected to the outlet of the anodic oxidation section.

3. A clinical analyser wastewater treatment apparatus as claimed in claim 1 wherein the anodic oxidation section includes a conductive diamond anode.

4. A clinical analyser wastewater treatment apparatus as claimed in claim 3 wherein the conductive diamond anode is a boron doped diamond electrode.

5. A clinical analyser wastewater treatment apparatus as claimed in claim 1 further comprising a control system to control the operation of the carbonator.

6. A clinical analyser wastewater treatment apparatus as claimed in claim 5 wherein the sensor is a pH sensor.

7. A clinical analyser wastewater treatment apparatus as claimed in claim 5 wherein the sensor is a conductivity sensor.

8. A clinical analyser wastewater treatment apparatus as claimed in claim 1 further comprising a valve for controlling flow along the recirculation pipe, and a control system configured to control the operation of the valve for providing partial or intermittent recirculation along the recirculation pipe.

9. A clinical analyser wastewater treatment apparatus comprising:
    a first pipe connected to a clinical analyser for receiving a stream of wastewater from the clinical analyser;
    a first holding tank connected to the first pipe for receiving the stream of wastewater;
    an anodic oxidation section located downstream from the first holding tank, the anodic oxidation section having an inlet for receiving a stream of wastewater from first holding tank and an outlet for dispensing a stream of the wastewater after processing in the anodic oxidation section;
    a heavy metal removal section connected to the outlet of the anodic oxidation section;
    a second holding tank for receiving a stream of the wastewater after processing in the heavy metal removal section, the second holding tank having an outlet;
    a carbonator section for receiving a stream of wastewater from the outlet of the second holding tank;
    a UV disinfection section;
    a pH sensor positioned downstream from the carbonator for measuring a parameter of a stream of the wastewater after processing in the carbonator section;
    a recirculation pipe having a first end connected to the apparatus after the UV disinfection section and a second end connected to the apparatus before the carbonator section;

a valve located at the first end of the recirculation pipe and controllable for channeling a portion of the wastewater along the recirculation pipe; and a drainpipe for dispensing wastewater processed by the apparatus.

10. A clinical analyser wastewater treatment apparatus as claimed in claim 9 further comprising a controller for controlling the carbonation of the wastewater in the carbonator and for receiving signals from the sensor for determining the pH level of the wastewater, the controller connected to the valve for controlling the flow of a portion of the wastewater along the recirculation pipe.

* * * * *